US006982668B1

(12) United States Patent
Doerry et al.

(10) Patent No.: US 6,982,668 B1
(45) Date of Patent: Jan. 3, 2006

(54) TANGENTIAL VELOCITY MEASUREMENT USING INTERFEROMETRIC MTI RADAR

(75) Inventors: Armin W. Doerry, Albuquerque, NM (US); Brian P. Mileshosky, Albuquerque, NM (US); Douglas L. Bickel, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 155 days.

(21) Appl. No.: 10/675,328

(22) Filed: Sep. 30, 2003

(51) Int. Cl.
 *G01S 13/524* (2006.01)
(52) U.S. Cl. ............... 342/160; 342/161; 342/162; 342/163; 342/104; 342/105; 342/115; 342/156

(58) Field of Classification Search ........ 342/159–163, 342/104, 105, 107–109, 115, 156, 195, 424
See application file for complete search history.

(56) References Cited

U.S. PATENT DOCUMENTS

| | | | | | |
|---|---|---|---|---|---|
| 4,549,184 | A | * | 10/1985 | Boles et al. ............... | 342/25 R |
| 4,630,051 | A | * | 12/1986 | Adams et al. ............... | 342/133 |
| 4,814,772 | A | * | 3/1989 | Wiley et al. ................. | 342/351 |
| 5,233,403 | A | * | 8/1993 | Mermelstein .............. | 356/28.5 |

OTHER PUBLICATIONS

"Moving target performance for RADARSAT-2", Thompson, A.A.; Livingstone, C.E.;IGARSS 2000, vol.: 6, Jul. 24-28, 2000 Ps:2599-2601.*
"Clutter effects on ground moving target velocity estimation with SAR along-track interferometry", Shen Chiu;IGARSS '03, vol.: Jul. 21-25, 2003, PS:1314-1319.*
"Range interferometry technique to determine radial wind", Guifu Zhang; Doviak, R.J.; Vivekanandan, J.;IGARSS '02, vol.: 4, 24 Jun. 28, 2002 Ps:2549-2552.*

* cited by examiner

*Primary Examiner*—John B. Sotomayor
(74) *Attorney, Agent, or Firm*—Hrayr A. Sayadian; Ortiz & Lopez, PLLC

(57) ABSTRACT

Radar systems use time delay measurements between a transmitted signal and its echo to calculate range to a target. Ranges that change with time cause a Doppler offset in phase and frequency of the echo. Consequently, the closing velocity between target and radar can be measured by measuring the Doppler offset of the echo. The closing velocity is also known as radial velocity, or line-of-sight velocity. Doppler frequency is measured in a pulse-Doppler radar as a linear phase shift over a set of radar pulses during some Coherent Processing Interval (CPI). An Interferometric Moving Target Indicator (MTI) radar can be used to measure the tangential velocity component of a moving target. Multiple baselines, along with the conventional radial velocity measurement, allow estimating the true 3-D velocity of a target.

28 Claims, 6 Drawing Sheets

TANGENTIAL VELOCITY MEASUREMENT USING INTERFEROMETRIC MTI RADAR

STATEMENT OF GOVERNMENT INTEREST

The United States Government has rights in this invention pursuant to Department of Energy Contract No. DE-AC04-94AL85000 with Sandia Corporation.

FIELD OF THE INVENTION

The present invention is generally related to radar systems. The present invention is also related to methods and systems used to determine a targets range and velocity. More particularly, the present invention is related to use of an interferometric moving target indicator radar to measure the tangential velocity component of a moving target. Multiple baselines, along with the conventional radial velocity measurement, allow estimating the true 3-D velocity vector of a target.

BACKGROUND

Although the present background describes the functionality and limitations of synthetic aperture radar systems or a particular class of communications, such description is merely provided to exemplify a problem capable of resolution with the present invention. Any discussion herein directed to specific radars or communications protocols should not be taken by those skilled in the art as a limitation on the applicability of the invention described herein.

Radar systems use time delay measurements between a transmitted signal and its echo to calculate range to a target. Ranges that change with time cause a Doppler offset in phase and frequency of the echo. Consequently, the closing velocity between target and radar can be measured by measuring the Doppler offset of the echo. The closing velocity is also known as radial velocity, or line-of-sight velocity. Doppler frequency is measured in a pulse-Doppler radar as a linear phase shift over a set of radar pulses during some Coherent Processing Interval (CPI).

Radars that detect and measure target velocity are known as Moving-Target-Indicator (MTI) radars. MTI radars that are operated from aircraft are often described as Airborne-MTI (AMTI) radars. When AMTI radars are used to detect and measure ground-based moving-target vehicles, they are often described as Ground-MTI (GMTI) radars.

In MTI radars, the angular direction of a target is presumed to be in the direction to which the antenna is pointed. Consequently, a MTI radar generally offers fairly complete position information (angular direction and range) to some degree of precision, but incomplete velocity information since Doppler is proportional to the time-rate-of-change of range, i.e. radial velocity. Tangential velocities, that is, velocities normal to the range direction do not cause a Doppler shift, so are not measured directly. Tangential velocities can be measured indirectly by tracking the angular position change with time, but this requires a somewhat extended viewing time for any degree of accuracy and/or precision.

Multiple MTI systems might be employed in concert, each measuring radial velocities in different spatial directions. In this manner, a two-dimensional (or even full three-dimensional) target velocity vector may be estimated. This technique, however, requires that the radars be widely separated to facilitate the necessary triangulation (e.g., being based on different aircraft in the case of GMTI systems).

GMTI systems are often employed from moving radar platforms such as aircraft, that is, the radar itself is in motion with respect to the ground. Consequently, the stationary ground itself offers Doppler frequency shifts. In addition, since different areas of the ground are within view of different parts of the antenna beam, and have somewhat different radial velocities, the ground offers a spectrum of Doppler frequencies to the radar. This is often referred to as the clutter spectrum, and can mask the Doppler returns for slow-moving target vehicles of interest. Of course, if a target's Doppler is outside of the clutter spectrum, its detection and measurement are relatively easy. This is called "exoclutter" GMTI operation. Detecting and measuring echo responses from slow-moving target vehicles that are masked by the clutter are considerably more difficult, and are called "endoclutter" GMTI operation.

The ability to observe targets masked by clutter is often called "sub-clutter visibility." Reducing the effects of clutter on detecting and measuring such targets' motion is often termed "clutter suppression." This is most often accomplished by employing multiple antennas on a single aircraft arrayed along the flight direction of the radar, and is often called a Displaced Phase Center Antenna (DPCA) technique, or Interferometric GMTI. The following patents provide background information on the use of more than one antenna in radar systems: U.S. Pat. No. 4,885,590, issued Dec. 5, 1989 to M. A. Hasan, entitled "Blind speed elimination for dual displaced phase center antenna radar processor mounted on a moving platform"; U.S. Pat. No. 4,086,590, issued Apr. 25, 1978 to W. B. Goggins, entitled "Method and apparatus for improving the slowly moving target detection capability of an AMTI synthetic aperture radar"; U.S. Pat. No. 5,559,516, issued Sep. 24, 1996 to J. A. Didomizio, R, A. Guarino, entitled "Dual cancellation interferometric AMTI radar"; U.S. Pat. No. 5,559,518, issued Sep. 24, 1996 to J. A. DiDomizio, entitled "Low target velocity interferometric AMTI radar"; and U.S. Pat. No. 5,818,383, issued Oct. 6, 1998 to E. F. Stockburger, H. D. Holt Jr., D. N. Held, R. A. Guarino, entitled "Interferometric moving vehicle imaging apparatus and method."

Interferometric techniques allow making independent angle measurements not affected by target motion, thereby facilitating discrimination of a moving vehicle in one part of the antenna beam from clutter in another part of the antenna beam that otherwise exhibits identical Doppler signatures. Interferometers can be constructed from separate distinct antennas, or from monopulse antennas that offer the equivalent of separate distinct antenna phase centers in a single structure. Although interferometric systems and method provide improved target analysis through clutter reduction, the acquisition of tangential velocity measurements within a single CPI still remains problematic, and has not been adequately addressed in the art. There remains a need for a more complete target velocity vector measurements and analysis for time-critical moving vehicles. Furthermore, there is a need that such measurement and analysis continue to be provided from the vantage point of a single system.

SUMMARY OF THE INVENTION

A radar interferometer can measure angular position to a target with a great deal of precision, even with a single radar pulse. It does so by measuring the phase difference between echoes arriving at the two antennas. A target with tangential velocity will exhibit a pulse-to-pulse change in the angular position as measured by the phase difference between the antennas. This manifests itself as an interferometric phase that changes with time, i.e., a Doppler difference frequency. By measuring this Doppler difference frequency over some Coherent Processing Interval (CPI), a tangential velocity can be calculated for the target. This tangential velocity will be in the direction of the interferometric baseline. Consequently, a multiple orthogonal baseline arrangement can measure tangential velocities in both the azimuth and elevation directions. These coupled with the radial velocity derived from traditional Doppler processing enables a full 3-dimensional velocity vector to be measured from a single CPI.

According to features of the present invention, subaperture techniques allow for filtering individual Doppler returns when multiple moving targets exist at the same range.

The techniques of the present invention are usable for a wide variety of radar systems applications, including air traffic control, ground vehicle target tracking, law-enforcement, and traffic monitoring and control. Techniques of the present invention also extend to other coherent remote sensing systems such as sonar, ultrasound, and laser systems.

BRIEF DESCRIPTION OF THE DRAWINGS

The accompanying drawings, which are incorporated in and form part of the specification, illustrate embodiments of the present invention and, together with the description, serve to explain relevant principles of the invention.

DETAILED DESCRIPTION OF THE EMBODIMENTS

Although the following provides a detailed description that includes examples of the functionality and limitations that can be found in radar systems or may refer to a particular class of signal detection and assessments using radar, such examples are merely provided to exemplify a signaling problem commonly found in the radar art. Any discussion herein directed to specific radars and their associated protocols should not be taken by those skilled in the art as a limitation on the applicability of the invention described herein.

With a monostatic radar employing a Linear-FM chirp, stretch-processing, and quadrature demodulation, it is well-known that the return echo exhibits a sampled video phase that can be adequately described by:

$$\Phi_V(i, n) = \frac{2}{c}(\omega + \gamma T_s i)(|r_c| - |r_s|) \quad (1)$$

where, c=velocity of propagation,

ω=radar center frequency,

γ=radar chirp rate, $T_s$=Analog to Digital conversion period (sampling period), i=intra-pulse sampling index with $-I/2 < i \leq I/2$, n inter-pulse index with—$N/2 < n \leq N/2$, $r_c$=vector from target reference location to radar, $r_s = r_c - s$ = vector from target exhibiting radar echo to radar, and s=vector from target reference location to target exhibiting radar echo.

Figure 1:
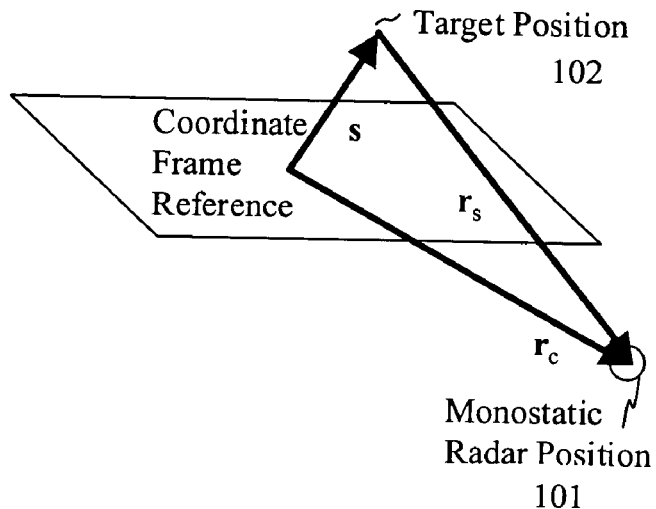
FIG. 1 provides an illustration of a vector $r_s$ from target exhibiting radar echo to radar, where $r_c$ is a vector from target reference location to radar, s is a vector from target reference location to target exhibiting radar echo, and $r_s = r_c - s$.

The geometry for this expression is illustrated in FIG. 1 wherein a monostatic radar 101 and target 102 are identified. As shown in FIG. 1, vectors $r_c$ and s can be presumed to be able to change with index n. The signal itself will have some amplitude A, and with this phase can be described by:

$$X_V(i,n) = A e^{j\Phi_V(i,n)}. \quad (2)$$

The phase is adequately approximated by:

$$\Phi_V(i, n) = \frac{2}{c}(\omega + \gamma T_s i) \frac{r_c \circ s}{|r_c|}. \quad (3)$$

Figure 2:
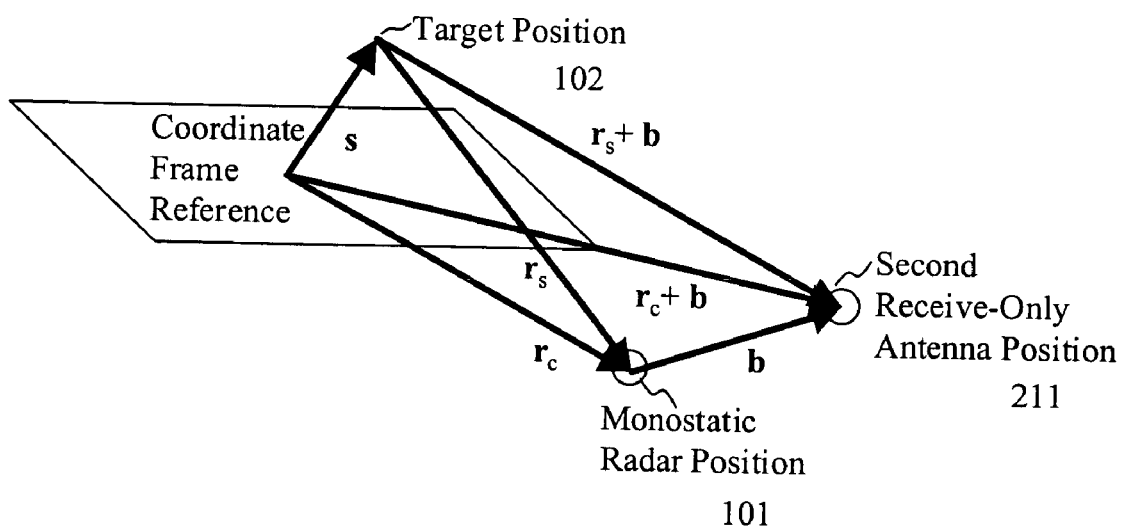
FIG. 2 provides an illustration of a geometry where a second receive-only antenna is located with a baseline vector b, with respect to the original transmit/receive antenna, and the bistatic return echo exhibits a video phase.

Referring to the geometry illustrated in FIG. 2, if a second receive-only antenna 211 is located with a baseline vector b with respect to the original transmit/receive antenna 101, then its bistatic return echo from target 102 exhibits a video phase described by:

$$\Phi_{V,b}(i, n) = \frac{1}{c}(\omega + \gamma T_s i)(|r_c + (r_c + b)| - |r_s + (r_s + b)|), \quad (4)$$

which for small baseline lengths can be adequately approximated by:

$$\Phi_{V,b} = \frac{2}{c}(\omega + \gamma T_s i)\left(\frac{r_c \circ s}{|r_c|} + \frac{b \circ s}{2|r_c|}\right). \quad (5)$$

The video signal that exhibits this phase can be described by:

$$X_{V,b}(i,n) = A e^{j\omega V, b(i,n)}. \quad (6)$$

When |b|=0, the monostatic case is reduced.

A moving target implies that target location vector s changes from radar pulse to pulse as:

$$s = s_0 + v_s T_p n \quad (7)$$

where,
- $s_0$=target reference position at n=0,
- $v_s$=target velocity vector, and
- $T_p$=Pulse Repetition Interval (PRI).

In general the radar itself can be moving, i.e. changing position from pulse to pulse as:

$$r_c = r_{c0} + v_c T_p n \qquad (8)$$

where,
- $r_0$=radar reference position at n=0, and
- $v_c$=radar velocity vector.

Assuming a constant baseline vector, an expansion to the approximation can be provided as:

$$\Phi_{V,b}(i,n) = \frac{2}{c}(\omega + \gamma T_s i)\left(\left(\frac{r_{c0} \circ s_0}{|r_{c0}|} + \frac{b \circ s_0}{2|r_{c0}|}\right) + \left(\frac{r_{c0} \circ v_s}{|r_{c0}|} + \frac{r_{c0} \circ s_0}{|r_{c0}|} + \frac{b \circ v_s}{2|r_{c0}|}\right)T_p n + \left(\frac{r_c \circ v_s}{|r_{c0}|}\right)T_p^2 n^2\right). \qquad (9)$$

Typical GMTI parameters are such that this can usually be further simplified to the an approximation, as follows:

$$\Phi_{V,b}(i,n) = \left\{\frac{2\gamma T_s}{c}\left(\frac{r_{c0} \circ s_0}{|r_{c0}|} + \frac{b \circ s_0}{2|r_{c0}|}\right)i + \frac{2\omega T_p}{c}\left(\frac{r_{c0} \circ v_s}{|r_{c0}|} + \frac{v_c \circ s_0}{|r_{c0}|} + \frac{b \circ v_s}{2|r_{c0}|}\right)n + \frac{2\omega}{c}\left(\frac{b \circ s_0}{2|r_{c0}|}\right)\right\}. \qquad (10)$$

Some constant phase terms that are inconsequential to target position and motion estimation have been intentionally ignored with the foregoing.

Given the foregoing analysis, the phase is then of a form:

$$\Phi_{V,b}(i,n) = \omega_i i + \omega_n n + \phi \qquad (11)$$

where, $$\omega_i = \frac{2\gamma T_s}{c}\left(\frac{r_{c0} \circ s_0}{|r_{c0}|} + \frac{b \circ s_0}{2|r_{c0}|}\right),$$

$$\omega_n = \frac{2\omega T_p}{c}\left(\frac{r_{c0} \circ v_s}{|r_{c0}|} + \frac{v_c \circ s_0}{|r_{c0}|} + \frac{b \circ v_s}{2|r_{c0}|}\right), \text{ and}$$

and $$\varphi = \frac{2\omega}{c}\left(\frac{b \circ s_0}{2|r_{c0}|}\right).$$

There are three principal terms for the present analysis. The first is a coefficient of index i, and represents a frequency with respect to index i. The second is a coefficient of index n, and represents a frequency with respect to index n. The third is a constant phase term with respect to indices i and n. A complete MTI data set corresponds to a data array of size N x I, with elemental positions denoted by indices n and i.

The coefficient of index i can be identified via a Fourier Transform of the video signal data over index i. The coefficient of index n can be identified via a Fourier Transform of the video signal data over index n. Performing Fourier Transforms across both indices i and n yields a range-Doppler map, where peak responses in the map indicate targets at a specific range and velocity. That is, the range-Doppler map can be described by:

$$Z_b(v,u) = \mathfrak{J}_n(\mathfrak{J}_i(X_V(i,n))) = \qquad (12)$$
$$\sum_n \sum_i X_V(i,n) e^{-j\omega_v i} e^{-j\omega_u n} = A W_v(\omega_v - \omega_i) W_u(\omega_u - \omega_n) e^{j\varphi}$$

where,
- v=the range index of the range-Doppler map with $-V/2 < v \leq V/2$,
- u=the Doppler index of the range-Doppler map with $-U/2 < v \leq U/2$,
- $\omega_v$=the map's range scale value corresponding to index v,
- $\omega_u$=the map's Doppler scale value corresponding to index u,
- $W_v(\ )$=the map's range impulse response function, with peak at $W_v(0)$, and
- $W_u(\ )$=the map's Doppler impulse response function, with peak at $W_u(0)$.

The range-Doppler map for the monostatic case can now be defined as:

$$Z_0(v,u) = Z_b(v,u)|_{b=0}. \qquad (13)$$

A coordinate frame with unit vectors can now defined as:
- $\hat{r} = -r_{c0}/|r_{c0}|$=range direction, such that $r_{c0} = -|r_{c0}|\hat{r}$,
- $\hat{a}$=azimuth direction vector, horizontal, to the right, and orthogonal to $\hat{r}$, and
- $\hat{e} = \hat{a} \times \hat{r}$=elevation direction vector.

Tangential velocities are in the azimuth and/or elevation directions and are embodied in the $b \circ v_s$ term.

The vector quantities in this frame can also be defined as:

$$r_{c0} = -|r_{c0}|\hat{r}$$

$$v_c = v_{cr}\hat{r} + v_{ca}\hat{a} + v_{ce}\hat{e}$$

$$s_0 = s_r\hat{r} + s_a\hat{a} + s_e\hat{e}$$

$$v_s = v_{sr}\hat{r} + v_{sa}\hat{a} + v_{se}\hat{e}$$

$$b = b_r\hat{r} + b_a\hat{a} + b_e\hat{e} \qquad (14)$$

A more simplified expression is therefore possible as follows:

$$\Phi_{V,b}(i,n) = \left\{\frac{2\gamma T_s}{c}\left(-s_r + \frac{b \circ s_0}{2|r_{c0}|}\right)i + \frac{2\omega T_p}{c}\left(-v_{sr} + \frac{v_c \circ s_0}{|r_{c0}|} + \frac{b \circ v_s}{2|r_{c0}|}\right)n + \frac{2\omega}{c}\left(\frac{b \circ s_0}{2|r_{c0}|}\right)\right\}. \qquad (15)$$

Exoclutter GMTI

Exoclutter GMTI generally is monostatic (i.e., no baseline is relevant). Furthermore, it assumes that (or resigns itself to the case where) target radial velocity offers Doppler shifts much greater than the clutter spectrum width, namely $|v_{sr}|>>|v_c\circ s_0|/|r_{c0}|$. Consequently the model for target phase becomes:

$$\Phi_{V,b}(i,n) = \frac{2\gamma T_s}{c}(-s_r)i + \frac{2\omega T_p}{c}(-v_{sr})n. \qquad (16)$$

Figure 3:
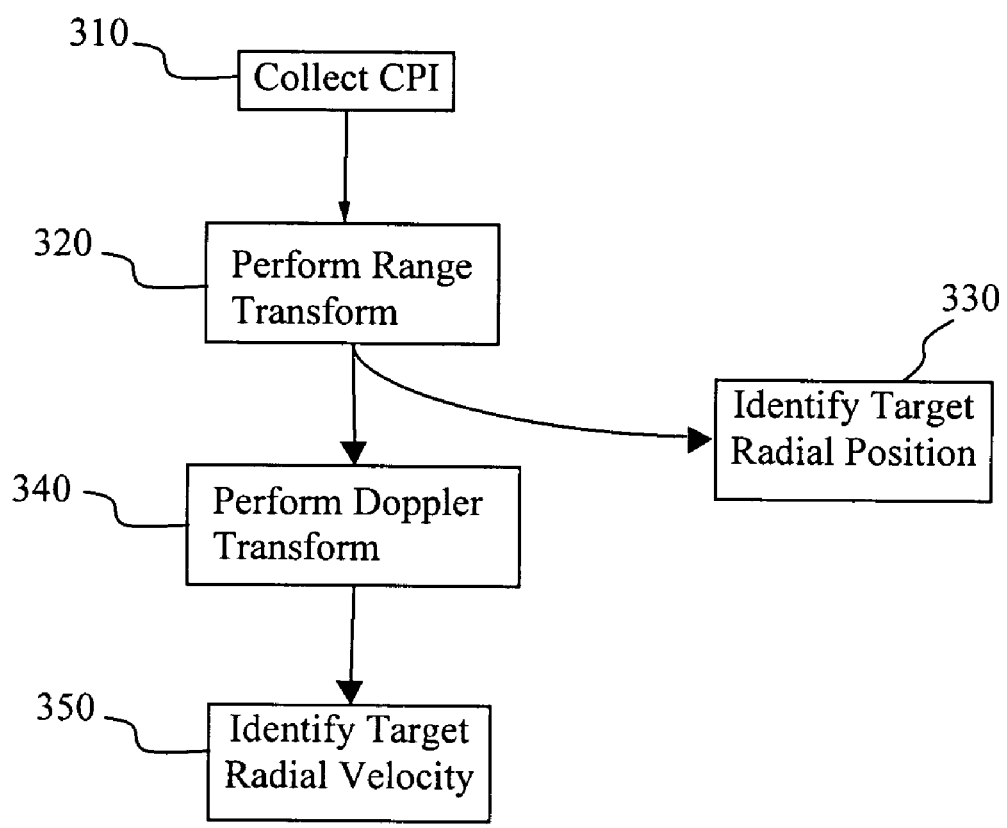
FIG. 3 illustrates method steps for processing Exoclutter GMTI signals in accordance with features of the present invention.

Referring to FIG. 3, a flow diagram providing steps for processing the Exoclutter GMTI signal is illustrated. According to the method, CPI is collected 310. A range transform is then performed 320. After the range transform is performed, the system can Identify a target's range position 330. Regardless if range position is first performed as shown in step 330, the system also performs a Doppler transform 340. After Doppler transform is conducted 340, a target's radial velocity can be determined 350.

Target radial position is measured by a range transform across index i, and target radial velocity is measured with a Doppler transform across index n. The range-Doppler map becomes approximately:

$$Z_0(v,u) = AW_v\left(\omega_v - \frac{2\gamma T_s}{c}(-s_r)\right)W_u\left(\omega_u - \frac{2\omega T_p}{c}(-v_{sr})\right). \qquad (17)$$

Endoclutter GMTI

Endoclutter GMTI uses interferometry with a baseline, and allows for measuring target radial velocities with Doppler shifts less than the clutter spectrum width, namely $|v_{sr}|<|v_c\circ s_0|/|r_{c0}|$. The baseline can be assumed to be small enough that it doesn't influence significantly the result of the Doppler transform across index n. Furthermore, the baseline should be generally aligned in the azimuth direction, and horizontal radar flight path is presumed. Consequently, the model for target phase can be:

$$\Phi_{V,b}(i,n) = \qquad (18)$$

$$\frac{2\gamma T_s}{c}(-s_r)i + \frac{2\omega T_p}{c}\left(-v_{sr} + \frac{v_{cr}s_r}{|r_{c0}|} + \frac{v_{ca}s_a}{|r_{c0}|}\right)n + \frac{2\omega}{c}\left(\frac{b_a s_a}{2|r_{c0}|}\right),$$

which is still in a form of equation (11), namely $\Phi_{V,b}(i,n)=\omega_i i+\omega_n n++\Phi$.

Figure 4:
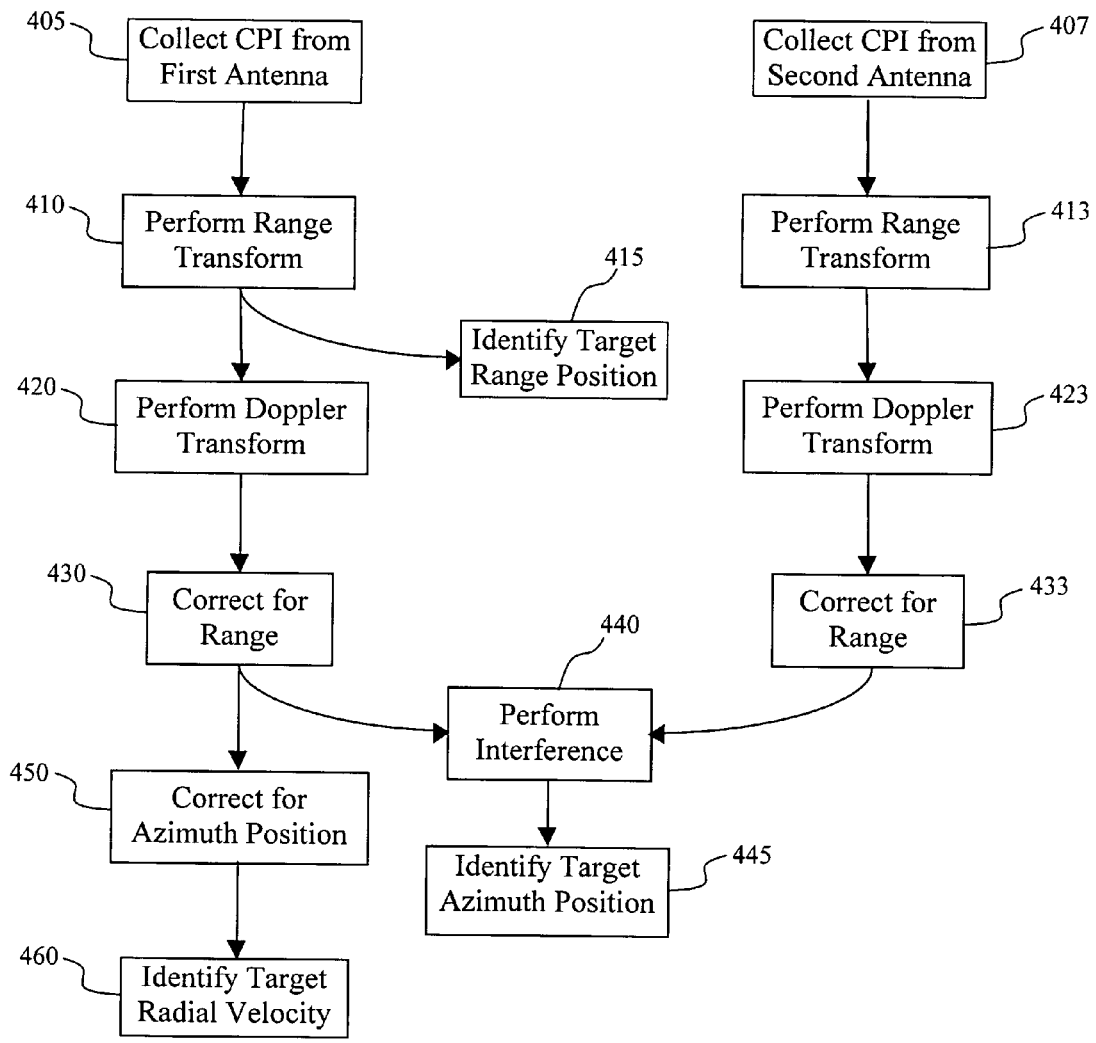
FIG. 4 illustrates additional method steps for processing Endoclutter GMTI signals in accordance with features of the present invention.

Referring to FIG. 4, the processing steps for the Endoclutter GMTI signal are shown. As shown in Step 405, CPI is collected from a first antenna, while CPI can also be collected using a second antenna 407. Next, a range transform can be performed 410 and 413 using information from both antennas. A targets range position can be identified 415 at this point. Next Doppler transform is concurrently performed 420, 423 by both antennas. Range correction, if applicable, can then be performed at both antennas at a radar as shown in step 430, 433. The system can then perform interference 440 given data provided from both antennas, after which target azimuth positions can be identified 445. If Target azimuth position requires correction, correction can occur as shown in step 450. Once the range and azimuth positions are determined, a radar system in accordance with the present invention can identify a target radial velocity as shown in step 460.

A range transform across index i enables the identification of target radial position $s_r$. That is, $$X_{R,b}(v,n)=\Im_i(X_v(i,n))=A\ W(\omega_v-\omega_i)e^{j\Phi_{R,b}(v,n)}, \qquad (19)$$

where the remaining phase is:

$$\Phi_{R,b}(v,n)=\omega_n n+\phi. \qquad (20)$$

A Doppler transform across index n identifies $\omega_n$, which in turn identifies the quantity $(V_{sr}-v_{cr}s_r/|r_{c0}|-v_{ca}s_a/|r_{c0}|)$. That is, the range-Doppler map is described by:

$$Z_b(v,u)=\Im_n(X_{R,b}(v,n))=A\ W_v(\omega_v-\omega_i)W_u(\omega_u-\omega_n)e^{j\Phi}. \qquad (21)$$

Since $s_r$ is known, its effects can be compensated to identify more specifically $(V_{sr}-v_{ca}s_a/|r_{c0}|)$, but still leaves some ambiguity in resolving energy to some combination of the unknown quantities radial target velocity $v_{sr}$ and target azimuth position $s_a$. The monostatic antenna does not contain the baseline term in the above model, but the bistatic second antenna does contain this term.

The range-Doppler maps made from both ends of the baseline can now be compared. The two results are compared by interfering them to yield:

$$IF(v,i)=Z_b(v,u)Z_0^*(v,u)=|A \\ W_v(\omega_v-\omega_i)W_u(\omega_u-\omega_n)|^2 e^{j\Delta\Phi(v,u)}, \qquad (22)$$

where * denotes complex conjugate, and at each pixel:

$$\Delta\phi(v,u) = \frac{2\omega}{c}\left(\frac{b_a s_a}{2|r_{c0}|}\right). \qquad (23)$$

Identifying this phase enables an independent estimate of target azimuth position $s_a$, which can then be used to correct the result of the earlier Doppler transform result to uniquely identify target radial velocity $v_{sr}$. These quantities can thereby been separated, or discriminated.

It is important to understand that the baseline's influence is analyzed only after the complete range-Doppler maps are formed for both receiving antennas.

Stationary MTI for Estimating Tangential Velocity

While extracting tangential velocity information, use of a stationary interferometric radar ($v_c=0$) with baseline oriented in the azimuth direction can be considered. The model for target phase determination is:

$$\Phi_{V,b}(i,n) = \qquad (24)$$

$$\frac{2\gamma T_s}{c}\left(-s_r + \frac{b_a s_a}{2|r_{c0}|}\right)i + \frac{2\omega T_p}{c}\left(-v_{sr} + \frac{b_a v_{sa}}{2|r_{c0}|}\right)n + \frac{2\omega}{c}\left(\frac{b_a s_a}{2|r_{c0}|}\right).$$

Figure 5:
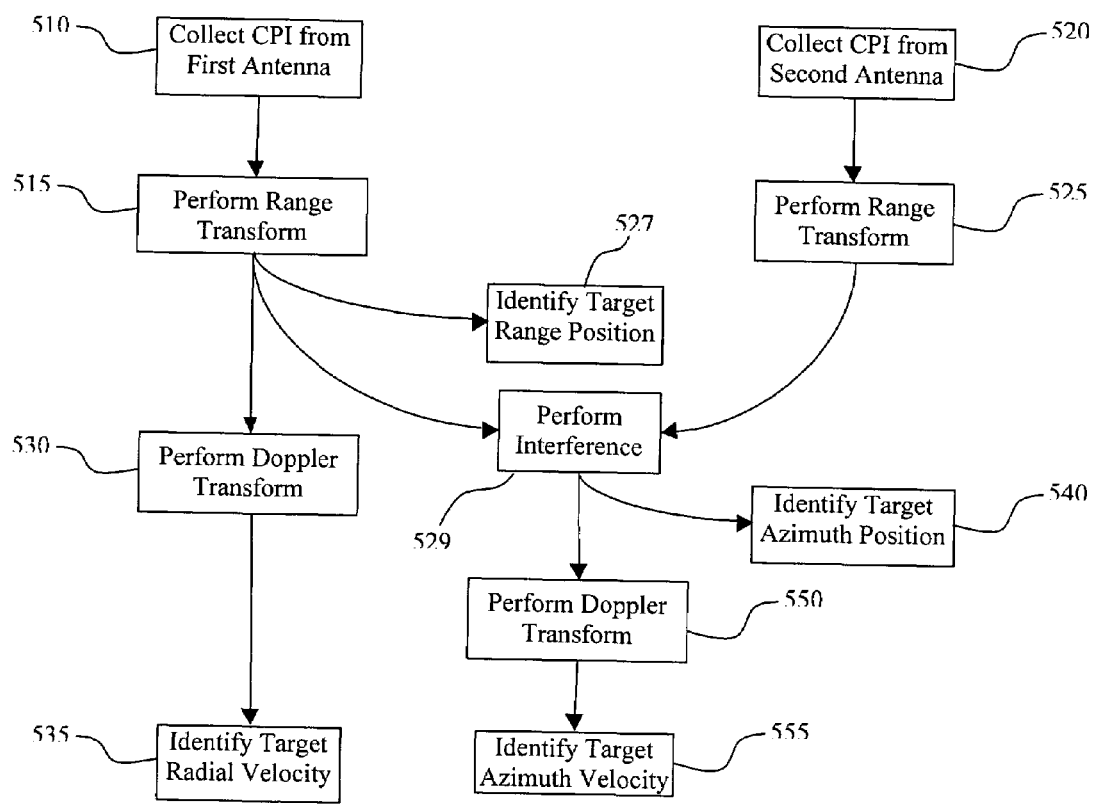
FIG. 5 illustrates method steps for operating a stationary MTI system model in accordance with features of the present invention.

Referring to FIG. 5, the processing steps for operating a stationary MTI model are illustrated. According to the method, CPI is collected from first and second antennas as shown in blocks 510 and 520. After CPI collection, range transform is performed 515, 525, where after a target's range position can be identified 527 given range transformation data from the first antenna; and additionally interference can be performed 529, given range transform data from both antennas. Range transform data from the first antenna can be used to perform Doppler transform as shown in block 530, where after a target's radial velocity can be identified 535.

After Interference is performed 529, a targets azimuth position can be identified as shown in block 540. A target's azimuth velocity can also be identified as shown in block 555, after Doppler transform is performed in block 550.

A range transform across index i enables the identification of a target's radial position $s_r$, and also leaves the data with a residual phase:

$$\Phi_{R,b} = \frac{2\omega T_p}{c}\left(-v_{sr} + \frac{b_a v_{sa}}{2|r_{co}|}\right)n + \frac{2\omega}{c}\left(\frac{b_a s_a}{2|r_{co}|}\right). \quad (25)$$

Target radial velocity can be estimated from the monostatic antenna data in the usual manner. If, however, this range-compressed data from each of the two antennas is interfered with each other, that is, a phase comparison is made before any Doppler transform, the resultant data can be expressed as:

$$IF_R(v,n) = A\ W(\omega_v - \omega_n)|^2 e^{j\Delta\Phi(v,n)}, \quad (26)$$

where, $$\Delta\phi(v, n) = \frac{2\omega T_p}{c}\left(\frac{b_a v_{sa}}{2|r_{co}|}\right)n + \frac{2\omega}{c}\left(\frac{b_a s_a}{2|r_{co}|}\right). \quad (27)$$

An interference signal with this phase characteristic is generated by point-by-point multiplication of the data from one range-compressed data set with the complex conjugate of the data from the other range-compressed data set.

The coefficient of index n in the phase is now a Doppler difference frequency that depends on target azimuth velocity $v_{sa}$. That is, for the interference signal now:

$$\omega_n = \frac{2\omega T_p}{c}\left(\frac{b_a v_{sa}}{2|r_{co}|}\right). \quad (28)$$

A Doppler transform of this interference signal over index n can now enable identification of target azimuth velocity $v_{sa}$ corresponding to the frequency content of the interference signal; that is, the range-Doppler map for this interference signal is now described by:

$$Z_{IF}(v,u) = \Im_n(IF_R(v,n)) = |A\ W_v(\omega_v - \omega_i)|^2 W_u(\omega_u - \omega_n) e^{j\Delta\Phi(v,)}, \quad (29)$$

whereby the 2-dimensional peak can now describe target range and target tangential velocity. The average phase of the interference signal remains dependent on target azimuth position $s_a$, which is:

$$\Delta\phi(v, 0) = \frac{2\omega}{c}\left(\frac{b_a s_a}{2|r_{co}|}\right). \quad (30)$$

Regardless, the target tangential velocity in the azimuth direction $v_{sa}$ can also be identified.

The shortfall of the stationary MTI model is that it can be very sensitive to noise, because data that is interfered is only range compressed up to this point, and doesn't benefit from the noise reduction offered by Doppler processing. Furthermore, multiple targets at the same range but at different radial velocities are indistinguishable from each other, and can in fact severely diminish the ability of a system to find the correct tangential velocity for any target. Nevertheless, the concept of tangential velocity derived from interferometric MTI can now herewith be established.

More Robust Airborne GMTI Radar for Estimating Tangential Velocity

A more complex scenario involving a moving radar can be addressed using airborne GMTI radars. For simplification of the following example, elevation velocities have been limited to zero, and baseline orientation to the range-azimuth plane. Furthermore targets of interest will be assumed to exist in the exoclutter region.

The complete phase model for the data has been determined as:

$$\Phi_{V,b}(i, n) = \quad (31)$$

$$\left\{\frac{2\gamma T_s}{c}\left(-s_r + \frac{b \circ s_0}{2|r_{co}|}\right)i + \frac{2\omega T_p}{c}\left(-v_{sr} + \frac{v_c \circ s_0}{|r_{co}|} + \frac{b \circ v_s}{2|r_{co}|}\right)n + \frac{2\omega}{c}\left(\frac{b \circ s_0}{2|r_{co}|}\right)\right\}.$$

Figure 6:
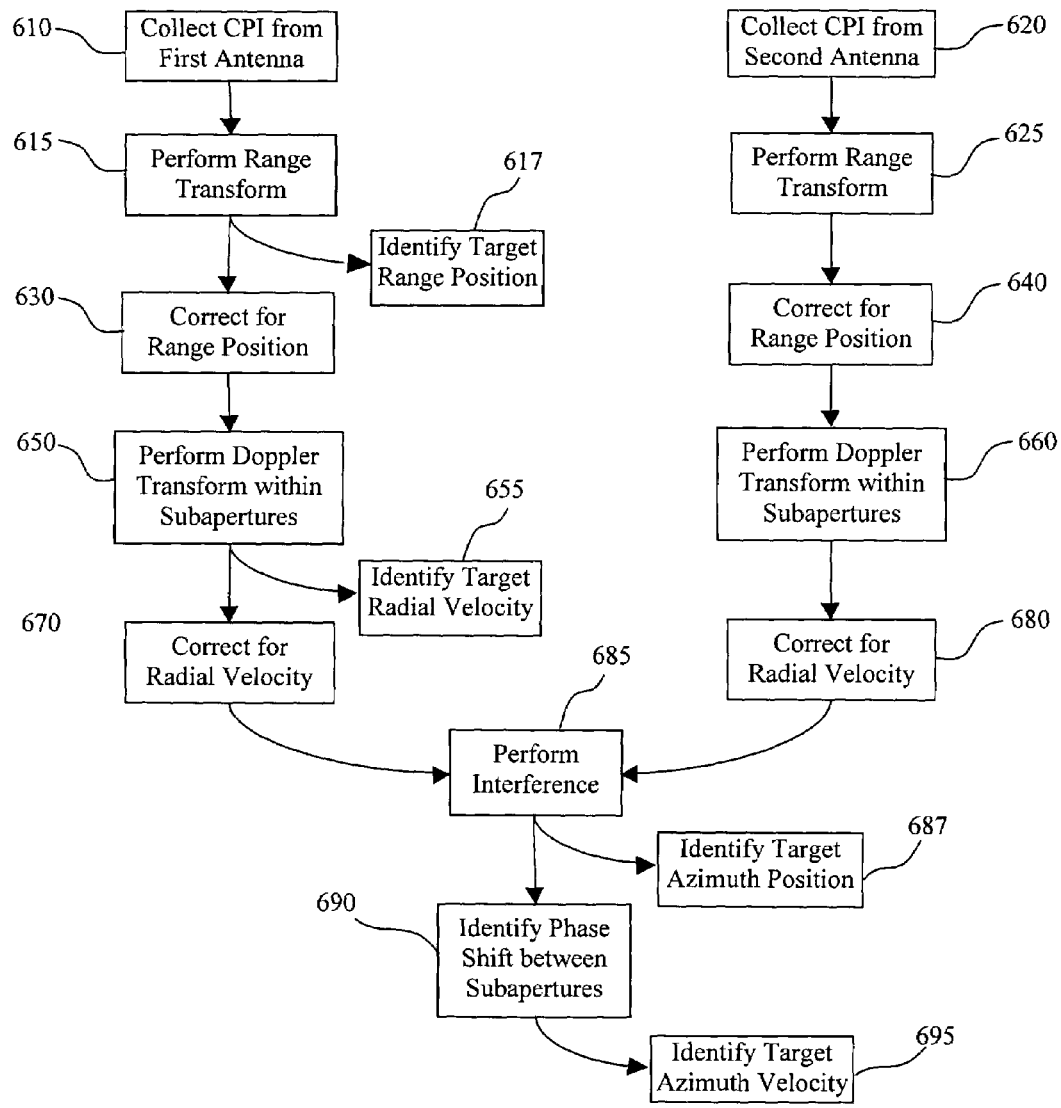
FIG. 6 illustrates method steps for operating an airborne GMTI system model in accordance with features of the present invention.

Referring to FIG. 6, the processing steps for operating a airborne GMTI radar are illustrated. According to the method, CPI is collected from first and second antennas as shown in blocks 610 and 620. After CPI collection, range transform is performed 615, 625, where after a target's range position can be identified 617 given range transform data from the first antenna. Range position can be corrected as shown in blocks 630 and 640, where after Doppler transform can be performed within subapertures as shown in blocks 650 and 660. A target's radial velocity can be identified 655 given the Doppler transform data from block 650. Radial velocity of the target can be corrected as shown in blocks 670 and 680, where after interference can be performed 685. The targets azimuth position can be determined 687 after Interference is performed 685. Furthermore, any phase shift between subapertures can be identified as shown in block 695, from which a target's azimuth velocity can be identified as shown in block 695.

A range transform of the data across index i enables the identification of a target's radial position $s_r$, and leaves the data with a residual phase:

$$\Phi_{R,b}(v, n) = \quad (32)$$

$$\frac{2\omega T_p}{c}\left(-v_{sr} + \frac{v_{cr}s_r + v_{ca}s_a}{|r_{co}|} + \frac{b_r v_{sr} + b_a v_{sa}}{2|r_{co}|}\right)n + \frac{2\omega}{c}\left(\frac{b_r s_r + b_a s_a}{2|r_{co}|}\right).$$

A function exhibiting some phase $\Theta$ perturbed by an undesired but known phase $\epsilon$ can be corrected by multiplying with a phase correction signal of unit amplitude and the negative of the phase perturbation. Accordingly:

$$(Ae^{j(\Theta+\epsilon)})e^{-j\epsilon} = Ae^{j(\Theta+\epsilon)-j\epsilon} = Ae^{j\Theta}. \quad (33)$$

In this manner, the data can be corrected for its influence by applying a phase correction to yield:

$$\Phi'_{R,b}(v, n) = \Phi_{R,b}(v, n) - \frac{2\omega}{c}\left(\frac{b_r s_r}{2|r_{co}|}\right) \quad (34)$$

because target radial position sr is now known, or more explicitly, $$\Phi'_{R,b}(v, n) = \frac{2\omega T_p}{c}\left(-v_{sr} + \frac{v_{ca}s_a}{|r_{co}|} + \frac{b_r v_{sr} + b_a v_{sa}}{2|r_{co}|}\right)n + \frac{2\omega}{c}\left(\frac{b_a s_a}{2|r_{co}|}\right). \quad (35)$$

At this point the CPI is split into two subapertures by dividing along index n to yield two new indices m and k such that:

$$n = m + \left(k - \frac{1}{2}\right)\frac{N}{2}, \quad (36)$$

where within a subaperture $-N/4 < m \leq N/4$, subaperture index k takes on values 0 or 1.

The range compressed data can then be modeled with exhibiting phase as shown in steps 630 and 640 of FIG. 6, according to the following:

$$\Phi'_{R,b}(v, n) = \left\{ \begin{array}{l} \frac{2\omega T_p}{c}\left(-v_{sr} + \frac{v_{ca}s_a}{|r_{co}|} + \frac{b_r v_{sr} + b_a v_{sa}}{2|r_{co}|}\right)m + \\ \frac{\omega T_p N}{c}\left(-v_{sr} + \frac{v_{ca}s_a}{|r_{co}|} + \frac{b_r v_{sr} + b_a v_{sa}}{2|r_{co}|}\right)k + \\ \frac{2\omega}{c}\left(\frac{b_a s_a}{2|r_{co}|}\right) - \frac{\omega T_p N}{2c}\left(-v_{sr} + \frac{v_{ca}s_a}{|r_{co}|} + \frac{b_r v_{sr} + b_a v_{sa}}{2|r_{co}|}\right) \end{array} \right\}. \quad (37)$$

Given exoclutter targets as the specimen, a Doppler transform across index m yields an estimate of target radial velocity $v_{sr}$ and a residual phase term:

$$\Phi_{D,b}(v, u, k) = \quad (38)$$

$$\left\{ \begin{array}{l} \frac{\omega T_p N}{c}\left(-v_{sr} + \frac{v_{ca}s_a}{|r_{co}|} + \frac{b_r v_{sr} + b_a v_{sa}}{2|r_{co}|}\right)k + \\ \frac{2\omega}{c}\left(\frac{b_a s_a}{2|r_{co}|}\right) - \frac{\omega T_p N}{2c}\left(-v_{sr} + \frac{v_{ca}s_a}{|r_{co}|} + \frac{b_r v_{sr} + b_a v_{sa}}{2|r_{co}|}\right) \end{array} \right\}.$$

The data can be corrected for its influence because a target radial velocity $v_{sr}$ is now known by applying a phase correction to yield:

$$\Phi'_{D,b}(v, u, k) = \left\{ \begin{array}{l} \frac{\omega T_p N}{c}\left(\frac{v_{ca}s_a}{|r_{co}|} + \frac{b_a v_{sa}}{2|r_{co}|}\right)k + \\ \frac{2\omega}{c}\left(\frac{b_a s_a}{2|r_{co}|}\right) - \frac{\omega T_p N}{2c}\left(\frac{v_{ca}s_a}{|r_{co}|} + \frac{b_a v_{sa}}{2|r_{co}|}\right) \end{array} \right\}. \quad (39)$$

The partially processed data from the two antennas can then be interfered with on a point-by-point basis. This would yields an interference signal result with phase given by:

$$\Delta\phi(v, u, k) = \left\{ \frac{\omega T_p N}{c}\left(\frac{b_a v_{sa}}{2|r_{co}|}\right)k + \frac{2\omega}{c}\left(\frac{b_a s_a}{2|r_{co}|}\right) - \frac{\omega T_p N}{2c}\left(\frac{b_a v_{sa}}{2|r_{co}|}\right) \right\}. \quad (40)$$

This interference result still has two subapertures. The average phase allows estimation of target azimuth position $s_a$. Compare the phase of corresponding interference data across the two subapertures, e.g., across index k, a phase difference measure of:

$$\Delta(\Delta\phi(v, u, k)) = \Delta\phi(v, u, 1) - \Delta\phi(v, u, 0) = \frac{\omega T_p N}{c}\left(\frac{b_a v_{sa}}{2|r_{co}|}\right), \quad (41)$$

can result, which allows unique identification of target azimuth velocity $v_{sa}$; which means, the phase difference at each pixel of the corresponding subaperture interferograms is proportional to tangential velocity $v_{sa}$.

In principle, splitting the CPIs into more than two subapertures prior to interfering them also allows extraction of tangential velocities. Furthermore, it can now likely be appreciated that a third receive-only antenna located with a second baseline vector oriented in the elevation direction would allow the additional discerning of the elevation-direction tangential velocity in a similar manner.

Accuracy and Precision of a Measurement

Interferometric measurements tend to be very sensitive to noise, and work best for targets with relatively high Signal-to-Noise Ratio (SNR). In this case, a phase difference can be measured to within an RMS error given by:

$$\sigma_{\Delta\theta} = \frac{1}{\sqrt{SNR}}, \quad (42)$$

and a radian frequency can be measured to within an RMS error given by:

$$\sigma_\omega = \frac{1}{T\sqrt{SNR}}, \quad (43)$$

where T is the RMS observation interval.

Consequently, for the more robust airborne GMTI as described above, including two subapertures per antenna, the precision of the tangential velocity measurement can be shown to be:

$$\sigma_{v_{sa}} = \left(\frac{c}{\omega}\right)\left(\frac{|r_{co}|}{a}\right)\frac{2}{T_p N\sqrt{SNR}}, \quad (44)$$

where SNR refers to the results of the interference operation.

Figure 7:
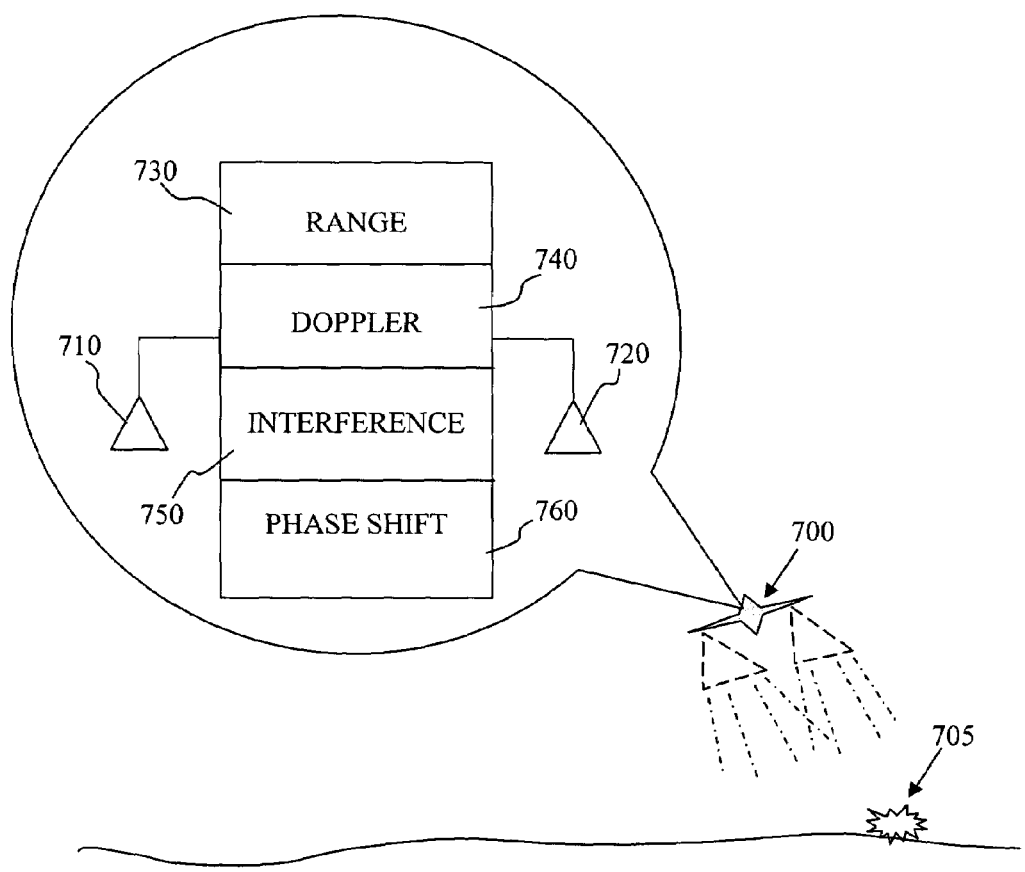
FIG. 7 illustrates a block diagram of a system and its components in accordance with features of the present invention.

Referring to FIG. 7, a callout from an airborne MTI radar system 700 that is illustrated in operation tracking a ground-based vehicle 705. According to the call-out, the radar system 700 includes a first antenna 710 and second antenna 720. The antennas provide acquired signals to the modules comprising the MTI. Modules can include Range Transform 730, Doppler Transform 740, Interference 750 and Phase shift identity 760 capabilities. An airborne radar system with modules as depicted in FIG. 7 can support the methods described herein and illustrated in FIGS. 3–6.

EXAMPLE

An interferometric GMTI has an antenna baseline spacing $b_a=3$ m, and an operating frequency of 16.7 GHz. Furthermore, a target exists with an actual tangential velocity of 90 m/s at a range $|r_{co}|=5$ km, and SNR after interference is 100 (20 dB). With a CPI of $T_pN=0.25$ s, an expected system precision of $\sigma_{v_{sa}}=3.8$ m/s can be expected.

The result of the previous example assumes a single CPI. It should be appreciated after the foregoing teaching that tracking the target over multiple CPIs in the conventional manner will allow refinement.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for measuring the tangential velocity of a moving target, comprising:
    a) collecting data over a coherent processing interval using at least two antennas assigned to a MTI radar system, wherein data includes range position and radial velocity of the moving target;
    b) performing interference using the data associated with said at least two antennas, thereby identifying the azimuth position of the moving target;
    c) identifying any phase shift that may exist between said at least two antennas; and
    d) identifying the azimuth velocity of the moving target based on the phase shift properties over time.

2. The method of claim 1, wherein a baselines known between said at least two antennas belonging to a single MTI radar system along with conventional radial velocity measurements acquired by the radar enable estimating at least one of the 2-D and true 3-D velocity vector for the moving target.

3. The method of claim 1, wherein tangential velocities of a target can be determined by identifying time dependence for the phase shift identified between the at least two antennas, wherein said at least two antennas are separated by a known baseline.

4. The method of claim 1, wherein the known baseline and radial velocity measurements acquired by the MTI radar system enable estimation of true 3-D velocity vectors for the moving target.

5. The method of claim 3, wherein the tangential velocity measurements require that interfering signals from the at least two or more antennas prior to complete Doppler processing of the entire set of pulses from either antenna.

6. The method of claim 3, including the step of processing the CPIs from the at least two antennas occurs in two or more subapertures allowing partial Doppler processing of each of said at least two antenna's signals, and enabling interfering of any result prior to completion of the Doppler processing.

7. The method of claim 1 wherein said step of collecting data over a coherent processing internal using at least three antennas, wherein a three-dimensional velocity vector can be estimated using said at least three antennas to form at least two non-parallel baselines including orthogonal components as viewed from the target location.

8. The radar system of claim 1, wherein said MTI radar system is ground based.

9. The radar system of claim 1, wherein said MTI radar system is airborne based.

10. A method for measuring the tangential velocity of a moving target, comprising:
    a) collecting data over a coherent processing interval using at least two antennas assigned to a MTI radar system, wherein data associated with each of said at least two antennas further processed separately by;
        i) performing range transformation of the data to thereby identify range position of the moving target;
        ii) correcting the data by accounting for the range position;
        iii) performing Doppler transform within subapertures using the data, thereby identifying radial velocity of the moving target;
        iv) correcting the data by accounting for the radial velocity;
    b) performing interference using the data associated with said at least two antennas, thereby identifying the azimuth position of the moving target;
    c) identifying any phase shift that may exist between said at least two antennas; and
    d) identifying the azimuth velocity of the moving target based on the phase shift.

11. A radar system, comprising:
    an interferometric moving target indicator radar including at least two antennas; and
    a tangential velocity module provided to measure the tangential velocity component of a moving target.

12. The system of claim 11, wherein multiple baselines known between said at least two antennas along with conventional radial velocity measurements acquired by the radar enable estimating the true 3-D velocity vector of a target.

13. The system of claim 11, wherein tangential velocities of a target can be measured using said radar by identifying the time dependence of the phase difference between said at least two antennas, wherein said at least two antennas are separated by a known baseline.

14. The system of claim 13, wherein tangential velocity measurement requires interfering signals from at least two or more antennas prior to complete Doppler processing of the entire set of pulses from either antenna.

15. The radar system of claim 11, wherein processing the CPIs from the at least two antennas occurs in two or more subapertures allowing partial Doppler processing of each of said at least two antenna's signals, yet still allows interfering of the result prior to completion of the Doppler processing.

16. The radar system of claim 11 further including at least three antennas, wherein a three-dimensional velocity vector can be estimated using said at least three antennas to form at least two non-parallel baselines including orthogonal components as viewed from the target location.

17. The radar system of claim 11, wherein said radar system is ground based.

18. The radar system of claim 11, wherein said radar system is airborne based.

19. The radar system of claim 11, wherein any subset of said at least two antennas is a monopulse antenna.

20. A radar system comprising:
- an interferometric moving target indicator (IMTI) radar including at least two or more antennas; and
- a module operatively connected to said IMTI radar, said module operatively arranged to measure the tangential velocity component of a moving target irradiated by said IMTI radar.

21. The radar system as in claim 20, wherein said module is operatively arranged to estimate the true 3-D velocity vector of a target using multiple reference baselines between said at least two antennas.

22. The radar system as in claim 20, wherein said module is operatively arranged to measure tangential velocity of the target by identifying the time dependence of the phase difference between said at least two or more antennas.

23. The radar system as in claim 22, wherein said module is operatively arranged to measure the tangential velocity of the target by interfering signals from said at least two or more antennas prior to complete Doppler processing of the entire set of pulses from either antenna.

24. The radar system as in claim 20, wherein said module is operatively arranged to process the CPIs from said at least two antennas, and to allow partial Doppler processing of each of said at least two antenna's signals.

25. The radar system as in claim 20, further including at least a third antenna, wherein said module is operatively arranged to estimate a three-dimensional velocity vector using said at least three antennas to form at least two non-parallel baselines.

26. The radar system as in claim 20, wherein said radar system is ground based.

27. The radar system as in claim 20, wherein said radar system is airborne based.

28. The radar system as in claim 20, wherein said at least two antennas include a monopulse antenna.

* * * * *